Aug. 6, 1940.                M. M. KINLEY                2,210,417
                              LEAK DETECTOR
                            Filed Nov. 1, 1937

*Locates leaks by sound intensity produced by leakage through the casing down in the well*

Inventor
M. M. KINLEY
Jesse R. Stone
Lester B. Clarke
    Attorneys

Patented Aug. 6, 1940

2,210,417

UNITED STATES PATENT OFFICE 2,210,417

LEAK DETECTOR

Myron M. Kinley, Houston, Tex.

Application November 1, 1937, Serial No. 172,175

3 Claims. (Cl. 137—77)

The invention relates to the location of leaks in casings in bore holes and comprehends method and means for accurately determining the location of each of such leaks.

The primary object of the method is to determine economically, quickly and accurately the location of leaks in casing anchored within a bore hole.

A further object is to provide a method whereby sound caused by liquid leaking through a well casing may be detected and variations in the intensity of the sound determined as an indication of the location of leaks.

Another object is to provide method of locating leaks by determining at a plurality of points longitudinally of the casing the intensity of sound produced by leakage through the casing.

Still another object is to locate leaks by moving a sound sensitive unit within the casing to render observable the fluctuation of sound along the casing.

Still another object is to provide a leak detecting system for determining the location of the leakage of water into a casing cemented in a well bore.

The various objects and features of the invention will be understood from the following detailed description of a typical manner of carrying out the method and a typical form of the invention throughout which description reference is made to the drawing in which.

Figures 1, 2:
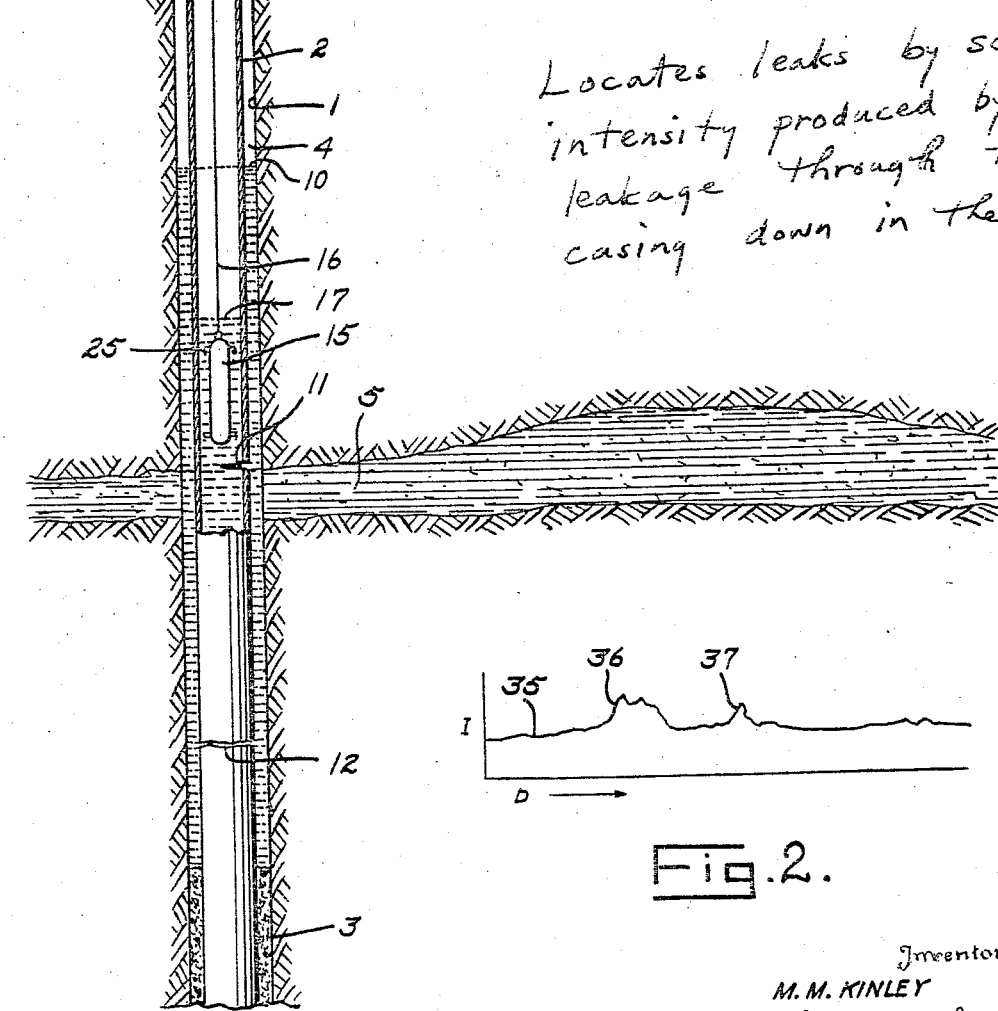
Fig. 1 is a vertical section through a well bore and illustrating an embodiment of the invention.
Fig. 2 illustrates graphical results to be obtained in accordance with the invention.

Considerable difficulty is encountered by the existence of leaks through casing anchored within a well bore. Such leaks may permit liquid to flow outwardly from within the casing, or, more frequently, they permit fresh or salt water to leak into the well and hence to undesirably dilute fluid produced from the well.

By means of the present invention such leaks may be readily and definitely located by determining the location of maximum sound produced by the liquid passing through the openings in the casing whereupon steps may be taken to close the leaks or to seal off a portion of the casing wherein such leak or leaks occur.

In Fig. 1 is shown a well bore 1, within which is positioned a casing 2, anchored in place by means of cement 3 whereby liquid is not permitted to enter the annular space 4 between the bore 1 and the casing 2. At 5 is shown a water bearing stratum through which water may flow into the annular space 4 and rise to a normal level 10, which is determined by the liquid head which causes water to flow through the stratum 5. Leaks are shown in the casing 2 at 11 and 12, whereby liquid may enter the casing.

As the invention comprehends the detection of sound produced by liquid passing through the leaks in the casing 2 a sound detector 15 is provided, such detector being suspended from a cable 16, which passes over a sheave 20 in the derrick 21 and is wound upon a drum 22, driven from any suitable source of power (not shown). This arrangement permits the detector 15 to be lowered into and withdrawn from the bore hole.

The sound detector 15 comprises an enclosed chamber for housing a suitable sound detecting mechanism, such, for example, as a microphone which responds to vibrations of the sound produced by the leaking liquid and renders such sound observable at the mouth of the well bore. The detector unit 15 is provided with arms or bumpers 25, preferably of rubber, which are adapted to contact the casing when the detector moves eccentrically within the casing 2. This construction avoids the introduction of extraneous sounds which would be produced by contact of the detector unit with the casing 2.

It is to be understood that while a microphone has been specifically referred to, the invention is not limited thereto for it is apparent that other suitable sound detecting mechanisms may be utilized.

When a microphone is used, as is illustrated in Fig. 1, the cable 16 will include suitable conductors to complete a circuit from the detector unit 15 to the earth's surface. Such conductors are shown as ending in terminals 30 or 31 at the drum 22 and a circuit is completed from these terminals through wires 32 to a suitable indicating device, generally designated as 33. The indicating device 33 is so constructed as to provide visual or aural indications of the intensity of the sound at the detector unit 15 as such unit is lowered into or withdrawn from the casing 2. As the specific construction of the indicating device 33 forms no part of the present invention and as such devices are well known in the art, conventional illustration only is shown of this device.

A preferred indication is a graphical record which may be produced as by means of a moving stylus or photographically in a manner well known in the art. Such a graph is shown at 35 in Fig. 2 in which the ordinate represents sound intensity while the abscissa indicates depth or distance from the mouth of the bore hole to the detector unit 15. The inflection 36 in the graph 35 occurs as the detector 15 approaches leak 11. After the leak is passed the sound intensity decreases but again increases at 37 as the leak 12 is approached.

It is believed apparent that the graph 35 forms a permanent record which enables definite location of the leaks 11 and 12 whereby the necessary steps may be taken to close such leaks and to eliminate the difficulties encountered thereby.

In practice of the invention it is obvious that there must be a differential head between the interior and exterior of the casing 2. Unless a static condition has been reached due to the leakage through the casing such differential head exists and observations may be made by traversing the casing 2 with the detector unit 15. If, however, static conditions have been reached a desirable differential head may be created by adding liquid to the interior of the casing or by withdrawing liquid therefrom. As this latter procedure is preferable the desired differential head may be produced by withdrawing liquid until the surface of the liquid in the casing reaches a suitable level such as that indicated at 17 so that such head determined by the difference in elevation of the levels 10 and 17 will be instrumental in causing liquid to flow through existing leaks to the interior of the casing. Observations may be made throughout the interval of time necessary for the liquid to rise from the level 17 to the normal static level 10.

It is to be understood that observations may be made continuously as the detector unit 15 is lowered within the casing 2 whereby a continuous indication is given by the instrument 33. Such observations, if regarded as above described, give rise to a continuous graph as illustrated in Fig. 2. On the other hand, it is apparent that observations may be made intermittently, if desired, without departure from the spirit of the invention.

It is obvious that the construction shown and the procedure described is capable of modification and such modifications as fall within the scope of the appended claims is considered to be within the spirit and intent of the invention.

What is claimed as new is:

1. The method of determining the location of leaks in the casing within a bore hole comprising the steps of altering the normal static liquid level within the casing to produce a hydrostatic head between the interior and exterior of the casing, picking up the sound from the liquid flow caused by the leakage due to such hydrostatic head, and measuring the intensity of the sound as an indication of the location of leaks in the casing.

2. The method of determining the location of leaks in the casing within a bore hole comprising the steps of lowering the liquid level within the casing to produce a hydrostatic head between the interior and exterior of the casing, picking up the sound of leakage caused by such hydrostatic head and measuring, the intensity of the sound as an indication of the location of leaks in the casing.

3. The method of determining the location of leaks in the casing within a bore hole comprising the steps of altering the normal static liquid level within the casing to produce a hydrostatic head between the interior and exterior of the casing so that leakage due to said head will set up sound vibrations in the liquid in the casing, moving a sound detector longitudinally of the casing, and determining the varying amplitude of the sound as an indication of the location of leaks in the casing.

MYRON M. KINLEY.